Dec. 15, 1931.  H. F. BICKEL  1,836,151
AIR BRAKE
Filed Oct. 20, 1930
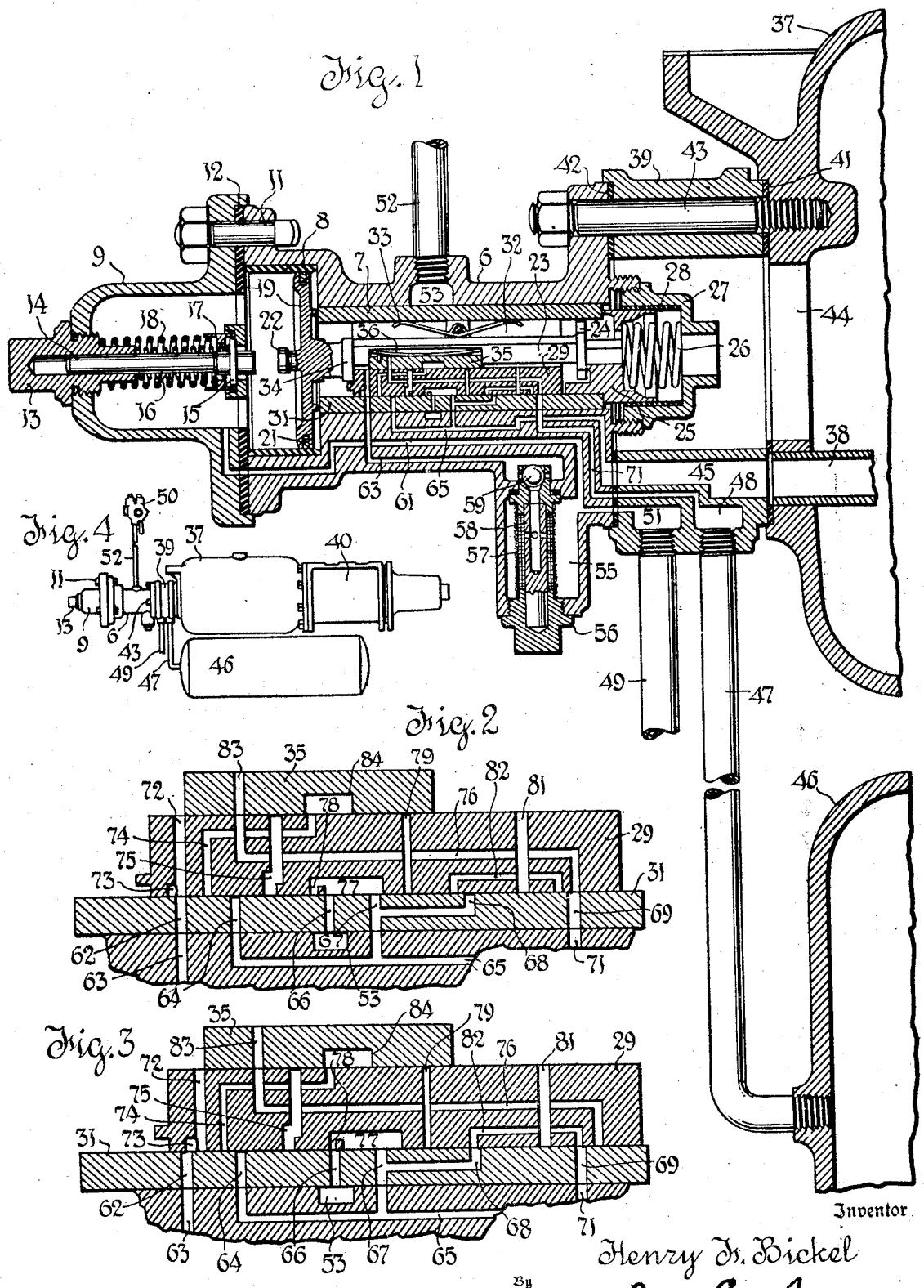
Inventor
Henry F. Bickel
By Dodge and Son
Attorneys Patented Dec. 15, 1931

1,836,151

UNITED STATES PATENT OFFICE

HENRY F. BICKEL, OF PLAINFIELD, NEW JERSEY, ASSIGNOR TO THE NEW YORK AIR BRAKE COMPANY, A CORPORATION OF NEW JERSEY

AIR BRAKE

Application filed October 20, 1930. Serial No. 490,007.

This invention relates to air brakes, and more particularly to triple valves.

As is well known, the so-called K triple valve is a marked advance over those which preceded it because of its characteristic of affording restricted recharge and release. The valve moves to restricted recharge and release position when the releasing pressure in the brake pipe is abnormally high. Such valves function to delay both recharge of the auxiliary reservoir and release of the brake cylinder pressure on the forward cars of a train, thus reducing the tendency to overcharge auxiliary reservoirs, conserving brake pipe air for releasing purposes, and holding pressure in the brake cylinders on cars at the front of the train to prevent the slack from running out.

The K triple valve moves to retarded release position against the resistance of a retard stop spring, and experience has shown there are quite definite limits which must be placed on the strength of the spring. There are also practical limits on the smallness of the restricted exhaust port. As a consequence, the K triple valve resists but does not actually prevent overcharge of the auxiliary reservoir, and the restriction of release is not so pronounced as is desired.

The purpose of the present invention is to provide a valve which dissipates any overcharge in the auxiliary reservoir before reapplication of the brakes can occur, and which at the same time, will secure adequate delay of release without entailing the use of unduly minute brake cylinder exhaust ports.

The invention is applicable to car brake equipments which include, in addition to the auxiliary reservoir, a second or supplemental reservoir. Broadly stated, the invention contemplates the connection of the two reservoirs together in normal release position so that both are charged from the brake pipe; the isolation of the two reservoirs from each other in restricted recharge and release position; and the connection of the supplemental reservoir in restricted release position to the brake cylinder or to the brake cylinder exhaust port in such a way that air from the supplemental reservoir is bled to the brake cylinder and thence to atmosphere.

From this arrangement it follows that in normal release position both reservoirs will be charged normally, and in restricted release and recharge position the auxiliary reservoir will be charged from the brake pipe at a restricted rate, and at the same time the supplemental reservoir will be vented to the brake cylinder and from the brake cylinder to atmosphere.

Thus, while the valve remains in restricted recharge and release position, pressure in the supplemental reservoir will drop, perhaps ten pounds per square inch and will supply air to the brake cylinder then open to exhaust through the restricted exhaust port. It follows, therefore, that the brake remains applied a longer time than it would otherwise, if the restricted port is the same size as that customarily used in the K triple valve.

When the triple valve shifts to normal release position the brake cylinder is quickly exhausted, if it is still under pressure, and the overcharge, if any, in the auxiliary reservoir is immediately dissipated by equalization of pressures in the two reservoirs.

In a prior patent of Charles A. Campbell, No. 1,632,756, granted June 14, 1927, there is described and claimed the idea of dissipating an overcharge in the auxiliary reservoir by permitting it to equalize with the supplemental reservoir in normal release position after the supplemental reservoir has been partially vented to atmosphere in restricted release position.

In the prior structure above mentioned the air vented from the supplemental reservoir passes directly to atmosphere and is not usefully applied. The present invention is an advance over the prior Campbell invention in that the air vented from the supplemental reservoir is applied to the maintenance of brake cylinder pressure.

If it is not desirable to avail of the full possibilities of delay afforded by the present invention, the restricted exhaust port may be increased somewhat in size which is advantageous from the maintenance standpoint.

The preferred embodiment is illustrated in the accompanying drawings, in which

Fig. 1 is a vertical axial section through the triple valve embodying the invention, the valve being shown connected to the brake pipe, auxiliary reservoir and supplemental reservoir; the brake cylinder connection also being shown. In this figure the valve is shown in normal release position.

Fig. 2 is an enlarged fragmentary section showing the triple slide valve and seat and the graduating valve in normal release position;

Fig. 3 is a view similar to Fig. 2 in restricted recharge and release position;

Fig. 4 is a view on a reduced scale showing the equipment for a single car.

In Figs. 1 to 3 the ports in the graduating valve, slide valve, and slide valve seat are diagrammatically illustrated as if they all lay in a single plane. In actual practice, however, it is preferred to locate the ports somewhat differently, as this, without changing their function, permits a somewhat more compact arrangement.

The body of the triple valve is indicated at 6 and is provided with the valve chamber bushing 7 and the cylinder bushing 8, as usual. The front cap is shown at 9 and is attached to the body 6 by the bolts 11, there being the usual front cap gasket 12.

Threaded into the front cap 9 is a guide plug 13 which receives the rear end of the graduating stem 14. This is provided with a collar 15 against which acts a light graduating spring 16 whose opposite end is seated against the plug 13.

After the graduating stem 14 has been moved back a short distance, the collar 15 picks up a surrounding floating collar 17 which serves as a spring seat for a heavier graduating spring 18, also sustained at its opposite end by the plug 13. The use of the two graduating springs is for the purpose of defining a quick service position, and is not a part of the present invention.

Working in the cylinder bushing 8 is the usual piston 19 with packing ring 21. The piston 19 has a graduating button 22 which engages the stem 14.

Formed integrally with the piston 19 is the usual piston stem 23 which is guided at its right hand end by the spider 24. The stem 23 engages in normal release position the slidable retard stop 25 of known form which is urged to the left by the retard stop spring 26. This spring is confined by a cap member 27 threaded into the right hand end of the body 6 and supporting a guide bushing 28 in which the retard stop 25 slides. Motion of the retard stop 25 to the left is limited by collision with the end of the valve chamber bushing 7.

The triple slide valve is shown at 29 and slides on a seat 31 formed in the lower portion of the valve chamber bushing 7. The valve 29 is provided with the usual upstanding wings 32 which carry a seating spring 33, as usual. The valve 29 has lost motion between the spider 24 and the collar 34 formed on the stem 23.

Riding on the top of the slide valve 29 is the graduating valve 35 which is closely confined in a notch formed in the stem 23 to receive the end which is held to its seat on top of the valve 29 by a bow spring 36.

The auxiliary reservoir is illustrated at 37 and is provided with the brake cylinder pipe 38 which leads through the reservoir. This arrangement will be recognized as a standard construction for freight brakes in which the brake cylinder 40 is mounted on the forward end of the auxiliary reservoir.

Interposed between the auxiliary reservoir 37 and the body 6 of the triple valve is a filler block or adapter 39 which makes tight joints both with the auxiliary reservoir and with the body 6 of the triple valve by means of gaskets 41 and 42. The parts are connected by studs, one of which appears at 43. The filler block 39 is formed with a central opening which aligns with the opening 44 in the head of the auxiliary reservoir and which communicates through the end of the spring seat 27 with the interior of the bushing 7. The filler block 39 is also formed with a passage 45 which communicates directly with the brake cylinder pipe 38.

The supplemental reservoir 46 is connected by pipe 47 with passage 48 in the filler block 39. The brake pipe 49 is connected directly with the passage 51 in the filler block 39. The pipe 52 connected to the body 6 is a brake cylinder exhaust pipe and leads to the usual retaining valve 50. The use of a retaining valve is entirely optional. The pipe 52 communicates with a passage 53 which extends around the bushing 7 and is the exhaust passage, as will be later described.

The brake pipe passage 51 in the filler block 39 communicates with a chamber 55 in the lower portion of the body 6. Mounted in this chamber is a combined strainer and check valve unit retained by the threaded plug 56. The details of this strainer structure are not of my invention and are not involved in the present invention. It will, therefore, suffice to say that air from chamber 55 flows through the strainer 57 and thence through the ports in the stem 58 upward past the check valve 59. The air which flows from the chamber 55 past the check valve 59 is the charging air for the reservoir and the check valve is for the purpose of preventing back flow.

There is also a passage 61 which leads from the chamber 55 to the space at the left of the piston 19 so that the piston 19 is subject on its left hand side to brake pipe pressure and on its right hand side to auxiliary reservoir pressure.

Porting of triple slide valve seat

The seat 31 for the triple slide valve is machined in the lower portion of the bushing 7 and is provided with the following ports: reservoir charging port 62 which is connected by passage 63 with the space above the check valve 59; quick service port 64 which leads to the brake cylinder passage 65, which passage communicates by way of passage 45 and pipe 38 directly with the brake cylinder; exhaust port 66 which communicates with the passage 53 leading to the exhaust pipe 52; service port 67 and emergency port 68, both of which communicate with the brake cylinder passage 65; supplemental reservoir port 69 which communicates by passage 71 with the chamber 48 and thence by way of pipe 47 to the supplemental reservoir 46.

Porting of triple slide valve

Slide valve 29 which rests on the valve seat 31 is provided with a charging port 72 having a narrow extension 73 which provides for restriction of recharge when it overlies the charging port 62. The port 72 leads from the bottom to the top of the slide valve 29 and is controlled at its upper end by the graduating valve.

There are two quick service ports 74 and 75 which register with the ports 62 and 64 in quick service position. These lead to the top of the slide valve and are controlled by the graduating valve.

There is a charging and equalizing port 76 which at times connects the auxiliary reservoir and the supplemental reservoir by coaction with the port 69 in the seat. This port also terminates on the top of the slide valve 29 and is controlled by the graduating valve 35.

On the lower face of the slide valve 29 is the exhaust recess 77 which is provided with a minute extension port or restricting port 78. In normal release position the recess 77 connects the ports 66 and 67 to provide normal or rapid release, while in restricted release position the flow is from port 67 through recess 77 and restricted opening 78 to port 66 which then registers with opening 78 (see Fig. 3).

There is a service port 79 which extends from the lower to the upper face of the slide valve and which in full service position registers with the port 67. At its upper end it is controlled by the slide valve 35.

There is an emergency port 81 which in emergency position registers with the emergency port 68 in the seat. It is not controlled by the graduating valve 35.

There is a vent port 82 formed in the body of the valve 29 and terminating at its ends in the lower face of the valve. In restricted recharge and release position (see Fig. 3) it connects the supplemental reservoir port 69 with the emergency brake cylinder port 68, establishing a connection from the supplemental reservoir by way of ports 69, 82, 68 with the brake cylinder passage 65, which at that time has restricted communication to atmosphere by way of port 67, recess 77, restricting port 78 and exhaust port 66.

The relation of the size of port 82 to the restricted exhaust port 78 determines the characteristics of brake cylinder pressure during restricted release. Brake cylinder pressure can be caused to have a rising tendency, or to remain nearly constant or fall more or less slowly. One very practical arrangement seeks maintenance of cylinder pressure approximately constant when brake cylinder pressure at the start of release is thirty pounds per square inch gage.

Porting of graduating valve

The graduating valve 35 has a through port 83 which in normal and restricted release position registers with port 76 in the slide valve. In all other positions this port is functionless.

On the lower face of the graduating valve 35 is a recess 84 which, when the graduating valve is displaced to the left relatively to the slide valve 29, connects the ports 74 and 75. The ports 74 and 75 are the quick service ports.

Operation

The operation of the device can now be traced. Assuming that the system is charged and that a service application has been made and is to be released, the engineer shifts his brake valve to release position, allowing air at main reservoir pressure to flow into the brake pipe. The triple valves on the forward cars will move to restricted release and recharge position. Those toward the rear of the train will move to normal release and recharge position.

Normal release and recharge (see Fig. 2)

Valves that move directly to normal release and recharge will exhaust brake cylinders by way of pipe 38, passage 45, passage 65, ports 67, 77 and 66 to atmosphere. Recharge will occur by way of pipe 49, chamber 51, chamber 55, check valve 59, passage 63, port 62 and port 72 without restriction. In both release positions the graduating valve 35 clears the upper end of the port 72.

A service application having preceded release, no air will have been drawn from the supplemental reservoir 46. Hence air flowing from the supplemental reservoir will partially recharge the auxiliary reservoir by flowing through the pipe 47, chamber 48, passage 71, port 69, port 76, port 83 to the valve chamber, and thence to the auxiliary reservoir. When the pressures in the two reservoirs have equalized, they will both be charged from the brake pipe simultaneously.

Restricted release (see Fig. 3)

The exhaust in the brake cylinder is restricted by the port 78 as explained. The port 76 is out of register with the port 69 so that reservoir 46 is isolated from the valve chamber, and consequently, is isolated from the auxiliary reservoir 37. However, port 71 is connected by port 82 to port 68, and consequently, with the brake cylinder passage 65.

It follows that the supplemental reservoir 46 supplies air to the brake cylinder at the same time that air is flowing out from the brake cylinder through the restricted port 78. The relative areas of the ports may be so chosen as to produce various desired pressure change characteristics for the brake cylinder and supplemental reservoir during the period of restricted release.

In any event, the pressure in the supplemental reservoir 46 will be lowered and usually the pressure drop will amount to about ten pounds per square inch.

Normal release after restricted release

When the engineer shifts his valve from full release to running position, brake pipe pressure at the front of the train will drop to normal value and the triple valves are shifted from restricted release and recharge to normal release and recharge position.

The brake cylinder pressures are immediately released, and the supplemental and auxiliary reservoirs are connected as already explained. Because of the venting which occurred in restricted release position, the supplemental reservoir will be below its normal charged pressure, and there is consequently an equalizing flow from the auxiliary reservoir to the supplemental reservoir. If the auxiliary reservoir is overcharged, this rapid equalizing flow will relieve the overcharge before the triple valve can shift to application position. Consequently undesired reapplication is prevented.

Quick service

When the button 22 engages the stem 14 it is momentarily arrested by the light graduating spring 16 in quick service position. In this position the ports 74 and 75 register with the ports 62 and 64 and are bridged by the recess 84 in the graduating valve. Consequently air flows from the brake pipe 49 through chambers 51 and 55, strainer 57, check valve 59, passage 63, port 62, port 74, recess 84, port 75, port 64 and passage 65 to the brake cylinder, producing a momentary local reduction of brake pipe pressure which causes the valve to overpower the light graduating spring 16 and move to service position.

Service position

In service position port 74 moves out of register with port 62, terminating the local reduction. Graduating valve 35 is moved to expose port 79 which is in register with port 67, permitting auxiliary reservoir air alone to flow into the brake cylinder.

Emergency position

In emergency position the piston 19 moves to the left and seats against the gasket 12, overpowering both graduating springs 16 and 18. At such time port 81 registers with port 68 and the right end of slide valve 29 exposes the port 71. Consequently, air from the supplemental reservoir, as well as auxiliary reservoir air, is admitted directly to the valve chamber and flows by way of ports 81 and 68 to the brake cylinder passage 65 and thence to the brake cylinder. In order to accelerate emergency action the brake pipe can be furnished with local emergency vent valves which are well known in the art and which are not here illustrated because they form no part of the present invention.

General considerations

The above are the simple functions, but these are modified in some degree by the sequence of events. For example, in emergency application air from the supplemental reservoir is used while in service applications it is not. Hence the initial pressure in the supplemental reservoir has different values at the start of release according to the character of the application which preceded release.

In the above description one particular form of triple valve making use of two reservoirs has been explained, simply for the purpose of making a full disclosure of a valve having all the necessary functions, but other types of double reservoir triple valves are known and the invention is applicable to such types.

For specific examples, while I prefer to charge from the brake pipe to the valve chamber through a port in the slide valve, the invention is not limited to any method of charging, and other conventional and well known charging arrangements might be used; for example, the charging groove controlled by the triple piston, an expedient which is as old as the triple valve itself. The check valve 59 may be omitted.

While it is convenient and, I believe, desirable to place in the main slide valve those ports which connect the supplemental reservoir alternately either to the valve chamber or to the brake cylinder exhaust port, such an arrangement is not strictly necessary and approximately equivalent results can be secured in other ways which will readily suggest themselves to those skilled in the art. Except as expressly stated in the claims I do not intend to limit myself to the formation of these ports in the triple slide valve proper, and might resort to any suitable valve mechanism operable by the triple piston in its motions between normal and restricted release positions.

While I prefer to make use of a graduating valve and to cause this valve to control the charge regulating port and the equalizing port in the slide valve, other arrangements are possible and are contemplated.

In other words, the particular embodiment illustrated is thought to have certain advantages and is specifically claimed, but variations such as those suggested are contemplated and are within the scope of the broader claims.

What is claimed is:—

1. The combination with a brake pipe, brake cylinder and two reservoirs, the first of which serves as an auxiliary reservoir, of a triple valve including a triple piston and slide valve controlling reservoir charging and brake cylinder exhaust, said piston and slide valve being temporarily shiftable by excessive brake pipe pressure from a normal release position in which free brake cylinder exhaust occurs to an abnormal position in which said exhaust is restricted; and means for connecting said reservoirs together when the parts are in normal release position, and for disconnecting them and connecting the second reservoir with the brake cylinder when in said abnormal position.

2. The combination with a brake pipe, brake cylinder and two reservoirs, the first of which serves as an auxiliary reservoir, of a triple valve including a triple piston and slide valve controlling reservoir charging and brake cylinder exhaust, said piston and slide valve being temporarily shiftable by excessive brake pipe pressure from a normal release and recharge position in which normal charging flow and brake cylinder exhaust flow occur to an abnormal position in which said flows are restricted; and means for connecting said reservoirs together when the parts are in normal release and recharge position, and for disconnecting them and connecting the second reservoir with the brake cylinder when in said abnormal position.

3. The combination of claim 1 further characterized in that the triple valve has a service application position in which the first reservoir alone supplies air to the brake cylinder, and an emergency application position in which both reservoirs supply air to the brake cylinder.

4. The combination of claim 2 further characterized in that the triple valve has a service application position in which the first reservoir alone supplies air to the brake cylinder, and an emergency application position in which both reservoirs supply air to the brake cylinder.

5. The combination with a brake pipe, brake cylinder and two reservoirs, the first of which serves as an auxiliary reservoir, of a triple valve including a triple piston and slide valve controlling reservoir charging and brake cylinder exhaust, said piston and slide valve being temporarily shiftable by excessive brake pipe pressure from a normal release position in which normal brake cylinder exhaust flow occurs to an abnormal position in which said exhaust flow is restricted; and means comprising ports in said slide valve for connecting said reservoirs together when the parts are in normal release position, and for disconnecting them and connecting the second reservoir with the brake cylinder when in said abnormal position.

6. The combination with a brake pipe, brake cylinder and two reservoirs, the first of which serves as an auxiliary reservoir, of a triple valve including a triple piston and slide valve controlling reservoir charging and brake cylinder exhaust, said piston and slide valve being temporarily shiftable by excessive brake pipe pressure from a normal release and recharge position in which normal reservoir charging and brake cylinder exhaust flows occur to an abnormal position in which said flows are restricted; and means comprising ports in said slide valve for connecting said reservoirs together when the parts are in normal release and recharge position, and for disconnecting them and connecting the second reservoir with the brake cylinder when in said abnormal position.

7. The combination with a brake pipe, brake cylinder and two reservoirs, the first of which serves as an auxiliary reservoir, of a triple valve including a triple piston and slide valve, the slide valve being provided with a charging port and a brake cylinder exhaust port, said piston and slide valve being temporarily shiftable by excessive brake pipe pressure from a normal release position in which said ports are open to an abnormal position in which said exhaust port is restricted; and means for connecting said reservoirs together when the parts are in normal release position, and for disconnecting them and connecting the second reservoir with the brake cylinder when in said abnormal position.

8. The combination with a brake pipe, brake cylinder and two reservoirs, the first of which serves as an auxiliary reservoir, of a triple valve including a triple piston and slide valve, the slide valve being provided with a charging port and a brake cylinder exhaust port, said piston and slide valve being temporarily shiftable by excessive brake pipe pressure from a normal release position in which said ports are open to an abnormal position in which said ports are restricted; and means for connecting said reservoirs together when the parts are in normal release position, and for disconnecting them and connecting the second reservoir with the brake cylinder when in said abnormal position.

9. The combination with a brake pipe, brake cylinder and two reservoirs, the first of which serves as an auxiliary reservoir, of a triple valve including a triple piston and slide valve, the slide valve being provided with a charging port and a brake cylinder exhaust port, said piston and slide valve being temporarily shiftable by excessive brake pipe pressure from a normal release position in which said ports are open to an abnormal position in which said exhaust port is restricted; and means comprising ports in said slide valve for connecting said reservoirs together when the parts are in normal release position, and for disconnecting them and connecting the second reservoir with the brake cylinder when in said abnormal position.

10. The combination with a brake pipe, brake cylinder and two reservoirs, the first of which serves as an auxiliary reservoir, of a triple valve including a triple piston and slide valve, the slide valve being provided with a charging port and a brake cylinder exhaust port, said piston and slide valve being temporarily shiftable by excessive brake pipe pressure from a normal release position in which said ports are open to an abnormal position in which said ports are restricted; and means comprising ports in said slide valve for connecting said reservoirs together when the parts are in normal release position, and for disconnecting them and connecting the second reservoir with the brake cylinder when in said abnormal position.

11. The combination with the slide valve chamber and seat of a triple valve, said seat having a charging port, an exhaust port, a brake cylinder port, and a supplemental reservoir port, of a slide valve shiftable on said seat and having a normal release position and an abnormal release position, said slide valve being provided with a charge regulating port which coacts with the charging port to permit rapid recharge in normal and slow recharge in abnormal position, an exhaust passage with constriction which coacts with the brake cylinder and exhaust ports to give free exhaust in normal position and slow exhaust in abnormal position, an equalizing port which connects said supplemental reservoir port with the valve chamber in normal position, but not in abnormal position, and a venting port which connects the supplemental reservoir port and brake cylinder port in abnormal position but not in normal position.

12. The combination with the slide valve chamber and seat of a triple valve, said seat having a charging port, an exhaust port, a brake cylinder port, and a suplemental reservoir port, of a slide valve shiftable on said seat and having a normal release position and an abnormal release position, said slide valve being provided with a charge regulating port which coacts with the charging port to permit rapid recharge in normal and slow recharge in abnormal position, an exhaust passage with constriction which coacts with the brake cylinder and exhaust ports to give free exhaust in normal and slow exhaust in abnormal position, an equalizing port which connects said supplemental reservoir port with the valve chamber in normal position, but not in abnormal position, a venting port which connects the supplemental reservoir port and brake cylinder port in abnormal position but not in normal position, and a graduating valve movable relatively to said slide valve and controlling said charge regulating port and equalizing port.

13. The combination with the slide valve chamber and seat of a triple valve, said seat having an exhaust port, a brake cylinder port, and a supplemental reservoir port, of a slide valve shiftable on said seat and having a normal release position and an abnormal release position, said slide valve being provided with an exhaust passage with constriction which coacts with the brake cylinder and exhaust ports to give free exhaust in normal and slow exhaust in abnormal position, an equalizing port which connects said supplemental reservoir port with the valve chamber in normal position, but not in abnormal position, and a venting port which connects the supplemental reservoir port and brake cylinder port in abnormal position but not in normal positon.

14. In a triple valve the combination of a casing; a triple piston and slide valve mounted therein and having a normal release position and a restricted release position to which latter position the parts move under high releasing brake pipe pressure, and in which the brake cylinder exhaust port is restricted; connections for an auxiliary reservoir and a supplemental reservoir; a port connecting said connections and opened by said slide valve in normal release position and closed thereby in restricted release position; and means controlled by said slide valve for connecting the supplemental reservoir connection with the brake cylinder exhaust port in restricted release position.

15. In a triple valve, the combination of a casing; a triple piston and slide valve mounted therein and having a normal release and recharge position and a restricted release and recharge position to which latter position the parts move upon high releasing brake pipe pressures, and in which the charging port and the brake cylinder exhaust passage are restricted; connections for auxiliary reservoir and a supplemental reservoir; a port connecting said connections, opened by said slide valve in normal release and recharge position and closed thereby in restricted release and recharge position; and means actuated by said triple piston for connecting the supplemental reservoir connection to the brake cylinder in restricted release and recharge position.

16. In a triple valve, the combination of a casing; a triple piston and slide valve mounted therein and of the type having a normal release and recharge position and a restricted release and recharge position to which latter position the parts are moved by high releasing brake pipe pressure and in which the charging port and brake cylinder exhaust port are restricted; connections for an auxiliary reservoir and a second reservoir; ports controlled by said slide valve arranged to connect said auxiliary and second reservoir connections together in normal recharge position, and in restricted release and recharge position to isolate the second reservoir connection from the auxiliary reservoir connection, and vent pressure fluid from the second reservoir connection through the then restricted exhaust port of the triple valve.

17. The combination with a brake pipe, brake cylinder and two reservoirs, the first of which serves as an auxiliary reservoir, of a triple valve including a triple piston and slide valve, said triple valve having a normal recharge and release position in which it connects the two reservoirs together, exhausts the brake cylinder freely, and controls charging flow from the brake pipe to the auxiliary reservoir, and a restricted release and recharge position to which the piston and slide valve are temporarily shiftable by excess brake pipe pressure, and in which position the charging flow to the auxiliary reservoir is restricted, the two reservoirs are isolated from each other, and the second reservoir and the brake cylinder are in restricted communication with a common exhaust passage.

18. The combination with a brake pipe, brake cylinder and two reservoirs, the first of which serves as an auxiliary reservoir, of a triple valve including a triple piston and slide valve, said triple valve having a normal recharge and release position in which it connects the two reservoirs together, exhausts the brake cylinder freely, and controls charging flow from the brake pipe to the auxiliary reservoir, and a restricted release and recharge position to which the piston and slide valve are temporarily shiftable by excess brake pipe pressure, and in which position the charging flow to the auxiliary reservoir is restricted, and in which the second reservoir and the brake cylinder are connected together and through a restriction to atmosphere.

19. The combination with a slide valve chamber and seat of a triple valve, said seat having an exhaust port, a brake cylinder port and a supplemental reservoir port, of a slide valve shiftable on said seat and having a normal release position and an abnormal release position, said slide valve being provided with an exhaust passage formed with a constriction, said passage coacting with the brake cylinder and exhaust ports in the seat to give free exhaust in normal release position and restricted exhaust in abnormal release position, an equalizing port which connects said supplemental reservoir port with the valve chamber in normal release position but not in abnormal release position; and means controlled by said slide valve for connecting the supplemental reservoir port with said exhaust port in abnormal release position but not in normal release position.

In testimony whereof I have signed my name to this specification.

HENRY F. BICKEL.